(12) United States Patent
Okamura et al.

(10) Patent No.: US 10,862,369 B2
(45) Date of Patent: Dec. 8, 2020

(54) POWER UNIT AND MOTOR UNIT FOR WAVE GEAR SPEED REDUCER

(71) Applicants: NIDEC-SHIMPO CORPORATION, Kyoto (JP); Nidec Corporation, Kyoto (JP)

(72) Inventors: Kikuo Okamura, Kyoto (JP); Takuro Yonemura, Kyoto (JP); Hitoshi Inoue, Kyoto (JP); Guo-Jhih Yan, Kyoto (JP); Keng-Chang Wu, Kyoto (JP); Hsiu-Ying Lin, Kyoto (JP)

(73) Assignees: NIDEC-SHIMPO CORPORATION, Kyoto (JP); NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/315,158

(22) PCT Filed: Jul. 5, 2017

(86) PCT No.: PCT/JP2017/024682
§ 371 (c)(1),
(2) Date: Jan. 4, 2019

(87) PCT Pub. No.: WO2018/008692
PCT Pub. Date: Jan. 11, 2018

(65) Prior Publication Data
US 2019/0312485 A1    Oct. 10, 2019

(30) Foreign Application Priority Data

Jul. 5, 2016  (JP) ................................ 2016-133624

(51) Int. Cl.
*H02K 7/10*    (2006.01)
*H02K 7/116*   (2006.01)
(Continued)

(52) U.S. Cl.
CPC ........... *H02K 7/116* (2013.01); *F16H 49/001* (2013.01); *F16H 57/021* (2013.01);
(Continued)

(58) Field of Classification Search
CPC .......... H02K 7/116; H02K 7/081; H02K 7/10; H02K 11/38; H02K 16/02; H02K 1/2793;
(Continued)

(56) References Cited

U.S. PATENT DOCUMENTS 2,789,673 A * 4/1957 Tetro ........................ G05G 5/04
                                                    192/215
3,239,699 A * 3/1966 Ferrary .................. H02K 7/116
                                                    310/83
(Continued)

FOREIGN PATENT DOCUMENTS

CN    103562593    2/2014
CN    103987994    8/2014
(Continued)

OTHER PUBLICATIONS

"International Search Report (Form PCT/ISA/210)" of PCT/JP2017/024682, dated Aug. 15, 2017, with English translation thereof, pp. 1-4.
(Continued)

*Primary Examiner* — Thanh Lam
(74) *Attorney, Agent, or Firm* — JCIPRNET

(57) ABSTRACT

A power unit comprises: a wave gear speed reducer, a rotary shaft extending in the axial direction; a rotor unit that rotates integrally with the rotary shaft; a stator unit disposed facing the rotor unit; and a motor casing to which the stator unit is secured. The motor casing has a second cover that covers the rotor unit and the stator unit from the other side in the axial direction. The rotary shaft extends toward the other side in the axial direction, penetrates the second cover, and is
(Continued)

connected to a cam. The second cover has a support part that extends toward the other side in the axial direction, supports the rotary shaft in a rotatable manner, and is positioned in a flexible cylindrical part of an external gear.

20 Claims, 3 Drawing Sheets

(51) Int. Cl.
*F16H 49/00* (2006.01)
*F16H 57/021* (2012.01)
*H02K 1/27* (2006.01)
*H02K 5/173* (2006.01)
*F16H 1/32* (2006.01)

(52) U.S. Cl.
CPC ......... *H02K 1/2793* (2013.01); *H02K 5/1735* (2013.01); *F16H 1/32* (2013.01)

(58) Field of Classification Search
CPC ...... H02K 5/04; H02K 5/1735; F16H 49/001; F16H 57/021; F16H 1/32
USPC ..... 310/75 R, 83, 89, 98, 99, 112, 114, 266, 310/268
See application file for complete search history.

(56) References Cited

U.S. PATENT DOCUMENTS

| | | | | |
|---|---|---|---|---|
| 3,301,091 A | * | 1/1967 | Reese | H02K 49/102 74/640 |
| 3,495,108 A | * | 2/1970 | Buskirk | G08C 19/48 310/68 R |
| 7,770,688 B2 | * | 8/2010 | Kenez | B62D 5/008 180/444 |
| 7,777,385 B2 | * | 8/2010 | Wingett | H02K 7/116 310/181 |
| 7,847,447 B2 | * | 12/2010 | Kume | H02K 7/116 310/100 |
| 9,752,467 B2 | * | 9/2017 | Kajiura | F01L 1/352 |
| 9,765,653 B2 | * | 9/2017 | Kajiura | F01L 1/344 |
| 2019/0226568 A1 | * | 7/2019 | Okamura | H02K 7/116 |

FOREIGN PATENT DOCUMENTS

| | | |
|---|---|---|
| JP | S6034751 | 3/1985 |
| JP | S60166261 | 11/1985 |
| JP | S61177243 | 11/1986 |
| JP | 2000175391 | 6/2000 |
| JP | 2008115896 | 5/2008 |
| JP | 2010004582 | 1/2010 |
| JP | 2010144839 | 7/2010 |
| JP | 2012050271 | 3/2012 |
| JP | 2014206265 | 10/2014 |
| JP | 2015092098 | 5/2015 |

OTHER PUBLICATIONS

Office Action of China Counterpart Application No. 201780041608.0, with English translation thereof, dated Mar. 16, 2020, pp. 1-14.
Office Action of China Counterpart Application, with English translation thereof, dated Sep. 1, 2020, pp. 1-13.

* cited by examiner

POWER UNIT AND MOTOR UNIT FOR WAVE GEAR SPEED REDUCER

CROSS-REFERENCE TO RELATED APPLICATION

This application is a 371 application of the international PCT application serial no. PCT/JP2017/024682, filed on Jul. 5, 2017, which claims the priority benefit of Japan application no. 2016-133624, filed on Jul. 5, 2016. The entirety of each of the abovementioned patent applications is hereby incorporated by reference herein and made a part of this specification.

TECHNICAL FIELD

This disclosure relates to a power unit and a motor unit for a wave gear speed reducer.

BACKGROUND ART

Speed reducers with various configurations that reduce rotation speeds and output the rotation of rotation shafts of electric motors. Patent Literature 1, for example, discloses a speed reducer using a wave gear mechanism. This wave gear speed reducer has an elliptical wave generator, a flexible flex spline formed in a circular shape coming in contact with the wave generator via a bearing positioned on the outer circumference of the wave generator having spline-shaped teeth on its outer circumference, and a circular spline having a larger number of spline teeth in a ring shape than the number of teeth of the flex spline which mesh and engage with the outer circumference of the flex spline.

In the above-described wave gear speed reducer mechanism, for example, in a case where the wave generator is corrected to an input shaft, the circular spline is fixed, and the flex spline is connected to an output shaft, when the wave generator rotates once in the clockwise direction, the flex spline rotates in the counterclockwise direction according to the difference in the number of teeth with respect to the circular spline. On the other hand, in a case where the flex spline is fixed and the circular spline is connected to an output shaft, the circular spline rotates according to the difference in the number of teeth with respect to the flex spline.

In that manner, the speed of rotation input to the wave generator is reduced using the difference in the number of teeth between the circular spline and the flex spline and then the rotation is output from the flex spline or the circular spline in the above-described wave gear speed reducer.

FIG. 1 of Patent Literature 1 discloses a configuration in which a wave gear speed reducer is connected to a rotation shaft of a drive motor. In the configuration of FIG. 1, the weight of the whole device is large, and the coupling unit connecting the rotation shaft to the wave gear speed reducer causes the size of the entire device to be larger and the length thereof to be longer. For this reason, in the configuration disclosed in Patent Literature 1, the size of the entire device is made compact by forming the speed reducer and the drive motor integrally. Specifically, in the configuration disclosed in Patent Literature 1, the rotor of the drive motor and the wave generator of the speed reducer are formed integrally.

CITATION LIST

Patent Literature

[Patent Literature 1]
Japanese Unexamined Utility Model Application Publication No. S 60-166261

SUMMARY

In the case where the speed reducer and the drive motor are formed integrally as disclosed in Patent Literature 1 described above, however, it is necessary to individually design a dedicated speed reducer and drive motor. Thus, various types of speed reducer and drive motor need to be designed in accordance with applications, which may cause the problem of versatility.

Meanwhile, in a case where the drive motor and the speed reducer formed as individual members are combined as illustrated in FIG. 1 of Patent Literature 1 described above, although versatility of the speed reducer can be ensured, the combination of the speed reducer and the drive motor results in a large size for the device as described in Patent Literature 1 above.

One or more aspects of the disclosure are directed to realize a configuration in which the motor unit can be attached to the wave gear speed reducer in a compact size.

A motor unit for a wave gear speed reducer according to an embodiment of this disclosure is a motor unit to be attached to a wave gear speed reducer which includes a cylindrical casing extending in an axial direction, a ring shaped internal gear disposed in a casing to be rotatable with respect to the casing and having internal teeth on an inner circumference, a flexible ring-shaped external gear disposed on an inner side of the internal gear in a radial direction, having one side in the axial direction fixed to the casing, and having external teeth that mesh with the internal teeth on an outer circumference, and an elliptical cam disposed on an inner side of the external gear in the radial direction which deforms the external gear in the radial direction when rotating. The motor unit includes a rotary shaft unit extending in the axial direction, a rotor unit provided to be rotatable with respect to the rotary shaft unit integrally with the rotary shaft unit, a stator unit disposed to face the rotor unit, and a motor casing covering the rotary shaft unit, the rotor unit, and the stator unit, to which the stator unit is fixed. The motor casing has a cover unit covering the rotor unit and the stator unit from the other side in the axial direction. The rotary shaft unit extends to the other side in the axial direction, penetrates the cover unit, and is connected to the cam. The cover unit has a support unit. The support unit extends to the other side in the axial direction, covers a part of the rotary shaft unit, rotatably supports the rotary shaft unit, and is positioned inside the external gear in a state in which the wave gear speed reducer is attached to the motor casing.

Advantageous Effects

According to a motor unit for a wave gear speed reducer of an embodiment, a motor unit for a wave gear speed reducer with a configuration in which the motor unit can be attached to the wave gear speed reducer in a compact size is obtained.

DESCRIPTION OF EMBODIMENTS

Figure 1:
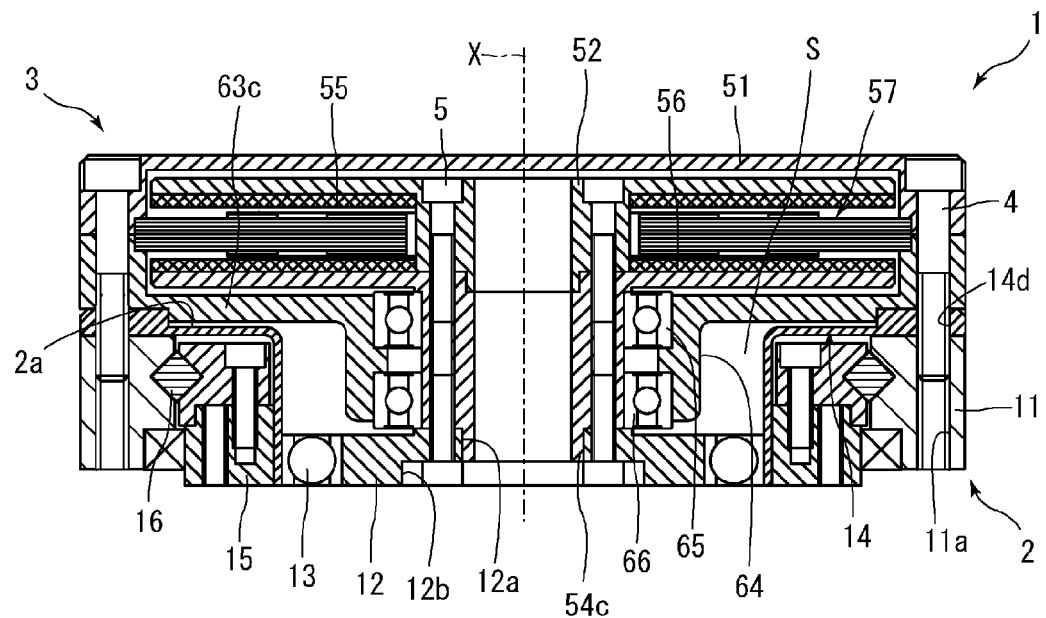
FIG. 1 is a cross-sectional diagram illustrating a schematic configuration of a power unit including a motor unit according to an embodiment.

An embodiment of this disclosure will be described below with reference to accompanying drawings. Note that the same reference numerals are given to the same or equivalent parts in the drawings and description thereof will not be repeated. In addition, dimensions of constituent members shown in each drawing may not fully represent actual dimensions of the constituent members, dimensional proportions of the constituent members, and the like.

Note that, in the following description, a direction parallel to a rotation shaft of a motor unit will be referred to as an "axial direction" or a "height direction," a direction orthogonal to the rotation shaft will be referred to as a "radial direction," and a direction along an arc around the rotation shaft will be referred to as a "circumferential direction," respectively. However, the "parallel direction" is assumed to also include a substantially parallel direction. In addition, the "orthogonal direction" is assumed to also include a substantially orthogonal direction.

In addition, in the following description, "one side in an axial direction" means the side of the motor unit of the power unit in the direction parallel to the rotation shaft, and "the other side in the axial direction" means the side of a wave gear speed reducer of the power unit in the direction parallel to the rotation shaft.

Overall Configuration

FIG. 1 illustrates a schematic configuration of a power unit 1 including a motor unit 3 for a wave gear speed reducer (which will be referred to simply as a motor unit) according to an embodiment of this disclosure. The power unit 1 includes a wave gear speed reducer 2 and the motor unit 3. The power unit 1 reduces a speed of rotation of a rotary shaft 52, which will be described below, of the motor unit 3 using the wave gear speed reducer 2 and outputs the rotation. The power unit 1 can be used as a power source for driving, for example, joints of robots, wheels of electric wheelchairs, and the like.

The wave gear speed reducer 2 and the motor unit 3 each have columnar shapes. The power unit 1 has the wave gear speed reducer 2 and the motor unit 3 of which the outer circumferences of both are connected by a plurality of bolts 4 while overlapping each other in the height direction (the top-bottom direction in FIG. 1). The power unit 1 has a columnar shape overall.

Wave Gear Speed Reducer

Figure 2:
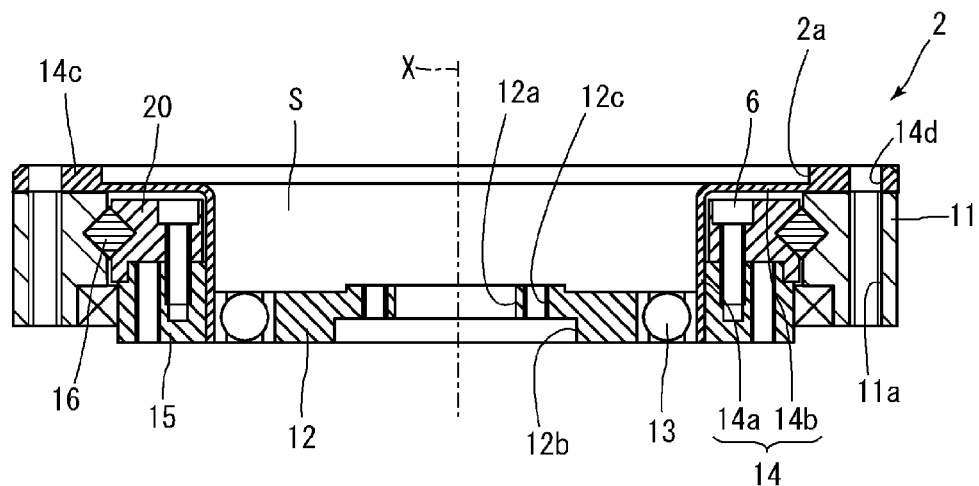
FIG. 2 is a cross-sectional diagram illustrating a schematic configuration of a wave gear speed reducer.
Figure 4:
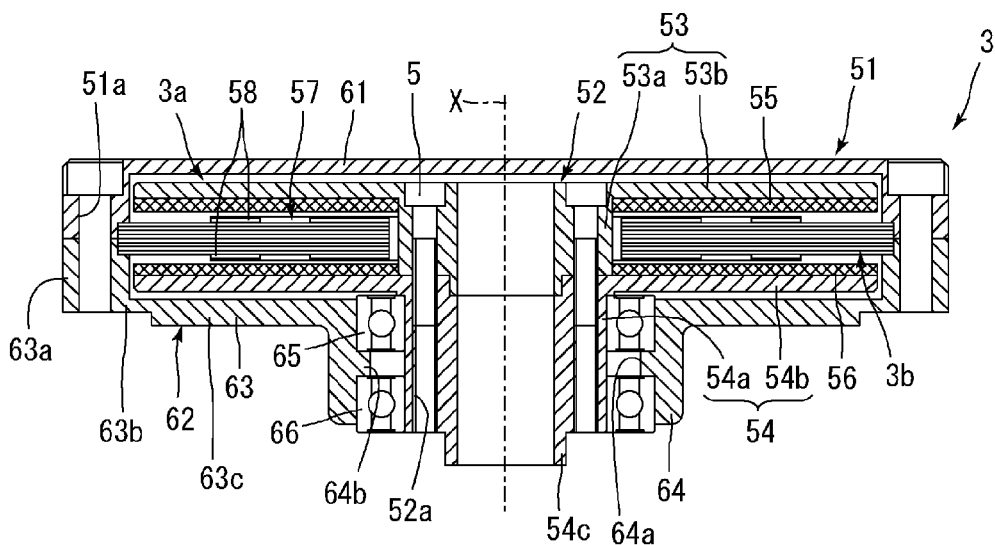
FIG. 4 is a cross-sectional diagram illustrating a schematic configuration of a motor unit.

As illustrated in FIG. 1 and FIG. 2, the wave gear speed reducer 2 is formed in a flat shape having a size in the radial direction (the left-right direction in FIG. 1 and FIG. 4) greater than a size in the height direction (the top-bottom direction in FIG. 1 and FIG. 4). The wave gear speed reducer 2 imparts wave motions to an external gear 14 using a cam 12 rotating together with a rotary shaft 52 of the motor unit 3, which will be described below, and thereby transmits the rotation of the cam 12 to the external gear 14 or an internal gear 15.

Specifically, the wave gear speed reducer 2 includes a casing 11, the cam 12, a bearing 13, the external gear 14, the internal gear 15, and a cross roller bearing 16.

The casing 11 has a cylindrical shape extending in the direction in which an axis X extends (which will be referred to as an axial direction below). The axis X coincides with an axis X of the rotary shaft 52 of the motor unit 3 in a state in which the wave gear speed reducer 2 is attached to the motor unit 3. Thus, the axial direction coincides with the axial direction of the rotary shaft 52 of the motor unit 3.

The casing 11 includes a plurality of screw holes 11a penetrating the casing 11 in the axial direction in the circumference direction. Bolts 3 (see FIG. 1) for connecting the motor unit 3 to the wave gear speed reducer 2 are inserted into the screw holes 11a. Note that the screw holes 11a is in connection with through holes 14d formed in the external gear 14 to form insertion holes for the bolts 4, and the external gear 14 is disposed on the one side in the axial direction from the casing 11 (the motor unit 3 side) as will be described below.

The cam 12 is disposed inside the casing 11. The cam 12 is connected to the rotary shaft 52 of the motor unit 3 and rotates integrally with the rotary shaft 52.

In more detail, the cam 12 is an elliptical plate member when viewed in the axial direction. The cam 12 is disposed inside the casing 11 such that the thickness direction thereof coincides with the axial direction.

The cam 12 has a through hole 12a (an insertion hole) penetrating the cam 12 in the axial direction. The cam 12 has a recess 12b at an opening part on the other side of the through hole 12a in the axial direction.

The cam 12 is disposed on the other side of the casing 11 in the axial direction when viewed in a direction orthogonal to the axial direction. Thus, the casing 11 has a space S on the one side in the axial direction, rather than the cam 12 side. A support unit 64 of the motor unit 3, which will be described below, is positioned in the space S in a state in which the wave gear speed reducer 2 is connected to the motor unit 3.

The cam 12 has a plurality of bolt holes 12c (see FIG. 2) formed to surround an opening (an opening on the one side in the axial direction) on the opposite side to an opening of the through hole 12a in which the recess 12b is provided. Bolts penetrating through holes 52a of the rotary shaft 52 in the motor unit 3 are fastened into the plurality of bolt holes 12c (see FIG. 1). Since the cam 12 is connected to the rotary shaft 52 of the motor unit 3 using bolts as illustrated in FIG. 1, the cam 12 rotates integrally with the rotary shaft 52 of the motor unit 3. Thus, the cam 12 rotates around the axis X when viewed in the axial direction.

Figure 3:
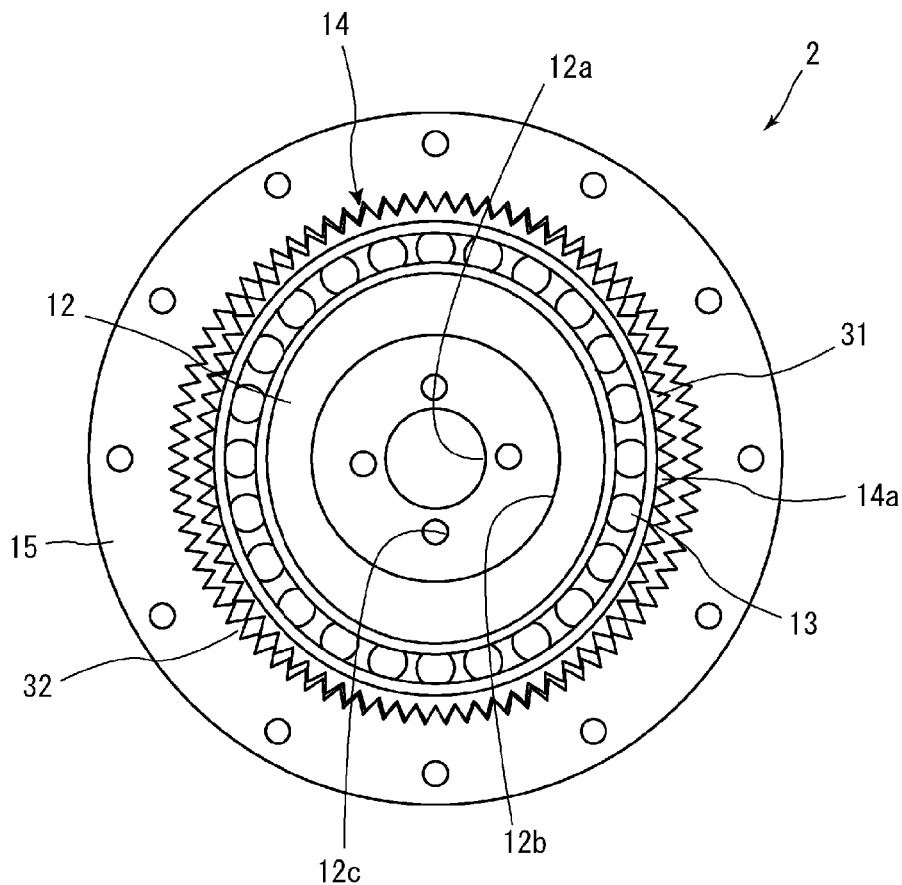
FIG. 3 is a diagram obtained by viewing an external gear, an internal gear, and a cam from one side in an axial direction.

The external gear 14 with a flange formed in a cylindrical shape and the internal gear 15 formed in a ring shape are disposed inside the casing 11 to surround the cam 12. That is, the external gear 14 is positioned on the outer side of the cam 12 in the radial direction, and the internal gear 15 is disposed on the outer side of the external gear 14 in the radial direction. FIG. 3 illustrates positional relationships between the external gear 14, the internal gear 15, and the cam 12 when the wave gear speed reducer 2 is viewed from the other side in the axial direction. Note that the casing 11 is not illustrated in FIG. 3.

The bearing 13 is disposed between the cam 12 and the external gear 14 when viewed in the axial direction. The bearing 13 is disposed between the cam 12 and the external gear 14 and is movable in the radial direction of the cam 12 in accordance with rotation of the cam 12. Accordingly, when the elliptical cam 12 rotates, the end of the cam 12 in the longitudinal direction presses the inner circumference of the external gear 14 radially outward via the bearing 13.

The external gear 14 is formed of a flexible thin plate in a cylindrical shape having a flange as illustrated in FIG. 2. Specifically, the external gear 14 has a cylindrical part 14a covering the outside of the cam 12 in the radial direction and a flange part 14b extending radially outward on the one side in the axial direction in the cylindrical part 14a.

The cylindrical part 14a has a plurality of external teeth 31 (see FIG. 3) on its outer circumferential surface at a uniform pitch in the circumferential direction. The external teeth 31 are formed on the outer circumferential surface of the cylindrical part 14a to extend in the axial direction. The internal circumferential surface of the cylindrical part 14a comes in contact with the bearing 13 disposed on the outer circumference of the cam 12. Thus, when the elliptical cam 12 rotates, the end of the cam 12 in the longitudinal direction can deform the cylindrical part 14a in the radial direction via the bearing 13. In this manner, wave motions can be imparted to the cylindrical part 14a of the external gear 14 in the radial direction when the elliptical cam 12 rotates.

The flange part 14b is formed in a ring shape when viewed in the axial direction. The outer circumference of the flange part 14b is fixed to the one side in the axial direction in the casing 11 as illustrated in FIG. 1 and FIG. 2. The flange part 14b has a thick part 14c at the outer circumference which is thicker than other parts of the external gear 14. Since the flange part 14b has the thick part 14c at the outer circumference, the wave gear speed reducer 2 has a recess 2a on the inner circumference at one side end thereof in the axial direction (a side end of the motor unit 3). A protrusion 63c of the motor unit 3, which will be described below, is positioned on the inner side of the recess 2a in the state in which the wave gear speed reducer 2 is combined with the motor unit 3. With this configuration, the motor unit 3 can be combined with the wave gear speed reducer 2 in an easily positioned state.

A plurality of through holes 14d penetrating the thick part 14c in the thickness direction are formed therein in the circumferential direction. The through holes 14d are provided at positions corresponding to the screw holes 11a of the casing 11 in a state in which the thick part 14c of the external gear 14 is disposed at the one side in the axial direction in the casing 11.

Note that the flange part 14b projecting from the cylindrical part 14a radially outward has a length in which the cylindrical part 14a can be easily deformed when the cylindrical part it is pressed due to rotation of the cam 12 as described above.

The internal gear 15 is a ring-shaped member as illustrated in FIG. 3 and has a plurality of internal teeth 32 formed on an inner circumferential surface thereof at a uniform pitch in the circumferential direction. The internal teeth 32 are formed on the internal circumferential surface of the internal gear 15 to extend in the axial direction. The internal gear 15 is disposed to surround the cam 12, the bearing 13, and the cylindrical part 14a of the external gear 14 from the outside in the radial direction. The internal gear 15 has a predetermined gap at a part in the circumferential direction with respect to the external gear 14 so that the internal teeth 32 of the internal gear 15 mesh with the external teeth 31 of the external gear 14 when an end of the cam 12 in the longitudinal direction presses and deforms the external gear 14 in the radial direction.

Note that a connection ring 20 is fixed to the one side in the axial direction on the internal gear 15 as illustrated in FIG. 2. The connection ring 20 is rotatably supported by an inner surface of the casing 11 via a cross roller bearing 16. Note that the connection ring 20 is fixed to the internal gear 15 using a plurality of bolts 6. Since a configuration of the cross roller bearing 16 is the same as that of a general cross roller bearing, detailed description thereof will be omitted.

The number of internal teeth 32 of the internal gear 15 is greater than that of the external teeth 31 of the external gear 14 as illustrated in FIG. 3. Since the number of external teeth 31 is different from the number of internal teeth 32 as described above, a rotation speed of the internal gear 15 can be made lower than a rotation speed of the cam 12 by rotating the cam 12 to deform the external gear 14 in the radial direction and causing of the external teeth 31 of the external gear 14 to sequentially mesh with the internal teeth 32 of the internal gear 15.

Therefore, in the above-described configuration, the wave gear speed reducer 2 can reduce a rotation speed of the rotary shaft 52 of the motor unit 3, which will be described below and the internal gear 15 can output the rotation.

Motor Unit

The motor unit 3 is an axial gap-type brushless motor. The motor unit 3 is formed in a flat shape having a size in the radial direction (the left-right direction in FIG. 1 and FIG. 4) greater than a size in the height direction as illustrated in FIG. 1 and FIG. 4.

The motor unit 3 includes a motor casing 51, the rotary shaft 52 (rotary shaft unit), a rotor unit 3a, and a stator unit 3b as illustrated in FIG. 4. The motor casing 51 is formed in a columnar shape extending in the direction in which the axis X extends (which will be referred to as an axial direction below). The axis X coincides with the axis X of the rotary shaft 52, which will be described below. The rotary shaft 52 penetrates the motor casing 51 on the other side in the axial direction.

The motor casing 51 houses the rotor unit 3a and the stator unit 3b. That is, the motor casing 51 covers the rotor unit 3a and the stator unit 3b. Note that the rotor unit 3a has rotor yokes 53b and 54b, and rotor magnets 55 and 56 (magnetic field generation units). The stator unit 3b has coil core parts 57.

The motor casing 51 has a plurality of bolt holes 4 on the outer circumference into which bolts 4 for connecting the motor unit 3 to the wave gear speed reducer 2 are inserted. The motor casing 51 is attached to the wave gear speed reducer 2 such that a part thereof penetrated by the rotary shaft 52 is positioned at the wave gear speed reducer 2 side as illustrated in FIG. 1.

The motor casing 51 has a bottomed cylindrical-shaped first cover 61 extending in the axial direction and a second cover 62 (cover unit) covering an opening of the first cover 61. The first cover 61 covers a half of the rotor unit 3a and the stator unit 3b in the axial direction. The second cover 62 covers the other half of the rotor unit 3a and the stator unit 3b in the axial direction. That is, the second cover 62 covers the rotor unit 3a and the stator unit 3b from the other side in the axial direction. The rotary shaft 52 penetrates the second cover 62.

The second cover 62 has a casing unit 63 covering the other half of the rotor unit 3a and the stator unit 3b in the axial direction and the support unit 64 rotatably supporting the rotary shaft 52.

The casing unit 63 has a cylindrical part 63a constituting a part of a side wall of the motor casing 51 and a flat plate unit 63b covering the rotor unit 3a and the stator unit 3b from the other side in the axial direction. The cylindrical part 63a has a cylindrical shape extending in the axial direction. The flat plate unit 63b has a thickness of which the direction coincides with the axial direction. When viewed in the axial direction, the support unit 64 is provided at the center of the flat plate unit 63b.

The flat plate unit 63b has an inner circumference having a thickness greater than that of an outer circumference. Accordingly, the second cover 62 has the protrusion 63c on the inner circumference in the radial direction. The protrusion 63c is positioned in the recess 2a of the wave gear speed reducer 2 in the state in which the motor unit 3 is combined with the wave gear speed reducer 2. Accordingly, when the motor unit 3 is attached to the wave gear speed reducer 2, the motor unit 3 can be positioned with respect to the wave gear speed reducer 2.

The support unit 64 has a cylindrical shape extending outward from the motor casing 51 from the casing unit 63 in the axial direction. That is, the support unit 64 extends from the casing unit 63 to the other side in the axial direction. The support unit 64 is formed integrally with the casing unit 63.

The support unit 64 has a through hole 64a as illustrated in FIG. 4. The rotary shaft 52 is rotatably disposed in the through hole 64a. That is, a plurality of support bearings 65 and 66 rotatably supporting the rotary shaft 52 are disposed between the rotary shaft 52 and the support unit 64 covering a part of the rotary shaft 52 in the through hole 64a. The support bearings 65 and 66 are disposed in a row in the axial direction. Note that a projection part 64b is provided between parts at which the support bearings 65 and 66 are positioned in the axial direction on an inner circumferential surface of the through hole 64a. Accordingly, it is possible to prevent the support bearings 65 and 66 from moving in the axial direction between the inner circumferential surface of the through hole 64a and the rotary shaft 52.

Since the rotary shaft 52 can be rotatably supported by the support unit 64 constituting a part of the motor casing 51 in the above-described configuration, it is possible to unitize the motor. Moreover, since the support bearings 65 and 66 are disposed in a row in the axial direction, the rotary shaft 52 can be supported to stably rotate.

The rotary shaft 52 has a cylindrical shape extending in the axial direction as illustrated in FIG. 4. The rotary shaft 52 is disposed in the motor casing 51 to be concentric with the motor casing 51. The rotary shaft 52 has a plurality of through holes 52a in its circumference direction into which the bolts (see FIG. 1) for fixing the rotary shaft 52 to the cam 12 of the wave gear speed reducer 2 are inserted. Note that the through holes 52a are screw holes provided with a screwing part at at least a part of inner circumferential surfaces thereof.

The rotary shaft 52 includes two members connected in the axial direction. Specifically, the rotary shaft 52 has a first rotary shaft 53 having the rotor yoke 53b and a second rotary shaft 54 having the other rotor yoke 54b. The first rotary shaft 53 and the second rotary shaft 54 are connected in the axial direction.

The first rotary shaft 53 and the second rotary shaft 54 have shaft units 53a and 54a and the rotor yokes 53b and 54b, respectively. The shaft units 53a and 54a have cylindrical shapes extending in the axial direction and are connected in the axial direction. Specifically, the shaft units 53a and 54a have a through hole (screw hole) which a bolt 5 can penetrate extending in the axial direction. This through hole constitutes the through holes 52a of the rotary shaft 52. Accordingly, the first rotary shaft 53 and the second rotary shaft 54 have the shaft units 53a and 54a connected by the bolt 5.

The shaft unit 54a of the second rotary shaft 54 has a projection 54c (insertion unit) at the end on the other side in the axial direction. The projection 54c has a cylindrical shape concentric with the shaft unit 54a. The projection 54c has an outer diameter smaller than that of the shaft unit 54a. That is, the shaft unit 54a is a large diameter unit having an outer diameter greater than that of the projection 54c.

The projection 54c is positioned in the through hole 12a of the cam 12 of the wave gear speed reducer 2 in the state in which the wave gear speed reducer 2 is combined with the motor unit 3. At this time, the shaft unit 54a abuts against the circumferential edge part of the through hole 12a of the cam 12. Accordingly, positioning of the cam 12 can be made using the rotary shaft 52 of the motor unit 3.

In addition, it is possible to easily align the rotation centers of the rotary shaft 52 of the motor unit 3 and the cam 12 of the wave gear speed reducer 2 with the above-described configuration. Accordingly, the motor unit 3 and the wave gear speed reducer 2 can be easily combined.

The rotor yokes 53b and 54b extend from the shaft units 53a and 54a outward in the radial direction. The rotor yokes 53b and 54b have disc shapes when viewed in the axial direction. The rotor yokes 53b and 54b are disposed to be parallel to each other with a predetermined gap therebetween in the axial direction. Note that "being parallel" mentioned above also includes a case where the rotor yokes 53b and 54b tilt to the extent that the rotor magnets 55 and 56 fixed to the rotor yokes 53b and 54b, which will be described below, do not come in contact with the coil core parts 57.

In the present embodiment, the shaft unit 53a and the rotor yoke 53b are a single component, and the shaft unit 54a and the rotor yoke 54b are a single component. The shaft unit 53a and the rotor yoke 53b may be separate components, and the shaft unit 54a and the rotor yoke 54b may be separate components.

The rotor magnets 55 and 56 have a ring shape and are fixed onto the surfaces of the rotor yokes 53b and 54b (see FIG. 4) opposite to the magnets. That is, the surface of the rotor magnet 55 facing the rotor yoke 54b is fixed to the rotor yoke 53b. The surface of the rotor magnet 56 facing the rotor yoke 53b is fixed to the rotor yoke 54b. Although not illustrated, the rotor magnets 55 and 56 have different magnetic poles alternately positioned in the circumferential direction.

Figure 5:
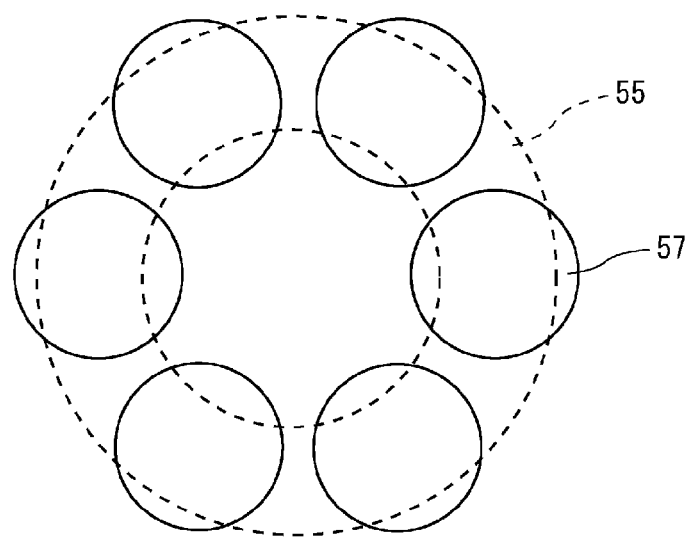
FIG. 5 is a diagram schematically illustrating a positional relationship between a rotor magnet and coil parts in the motor unit when the motor unit is viewed in a thickness direction.

The coil core parts 57 are formed to have, for example, a columnar shape extending in the axial direction. A plurality of coil core parts 57 (six in the example of the present embodiment) are disposed in the motor casing 51 in the circumferential direction when the motor unit 3 is viewed in the axial direction as schematically illustrated in FIG. 5. The coil core parts 57 are each sandwiched by ring-shaped plates 58 in the axial direction as illustrated in FIG. 4. Outer circumferential surfaces of the ring-shaped plates 58 are fixed to the inner circumferential surface of the motor casing 51. That is, the coil core parts 57 correspond to stators of the motor. Although not particularly illustrated, the coil core parts 57 have wound coils on their side surfaces.

A gap is formed between the rotor magnets 55 and 56 and the coil core parts 57 in the axial direction of the rotary shaft 52. The axial gap-type motor unit 3 having the above-described configuration is formed in a more compact size in the height direction (the axial direction) than a radial gap-type motor having the same output performance.

In addition, the rotor magnets 55 and 56 are disposed at positions at which the coil core parts 57 are interposed therebetween in the axial direction. That is, the rotor unit 3a has the two magnetic field generation units disposed with the stator unit 3b interposed therebetween. Accordingly, an output of the motor unit 3 can be doubled in comparison to the configuration in which a rotor magnet is disposed at only one side of a coil core part 57. Thus, improvement in output of the motor unit 3 can be achieved.

With the above-described configuration, the wave gear speed reducer 2 has the space S on the one side of the cam 12 in the axial direction. By combining the wave gear speed reducer 2 and the motor unit 3, the support unit 64 of the motor unit 3 is positioned in the space S. Accordingly, the motor unit 3 and the wave gear speed reducer 2 can be connected to form a compact configuration.

Other Embodiments

Although the embodiment of this disclosure has been described above, the above-described embodiment is merely an example for implementing the present invention. Thus, the present invention is not limited to the above-described embodiment, and the above-described embodiment can be appropriately modified in a scope not departing from the gist of the invention.

In the embodiment, two bearings are disposed between the support unit 64 and the rotary shaft 52 of the motor unit 3 in a row in the axial direction of the rotary shaft 52. However, three or more bearings may be disposed between the support unit 64 and the rotary shaft 52.

In the embodiment, the rotary shaft 52 of the motor unit 3 has the projection 54c inserted into the through hole 12a of the cam 12. However, the projection 54c may not be provided in the rotary shaft 52. In addition, in the embodiment, the casing unit 63 of the second cover 62 has the protrusion 63c to be positioned in the recess 2a of the wave gear speed reducer 2 in the state in which the wave gear speed reducer 2 is combined with the motor unit 3. However, the protrusion 63c and the recess 2a need not be provided in the motor unit 3 and the wave gear speed reducer, respectively.

In the embodiment, the coil core parts 57 of the stator unit 3b are interposed between the rotor magnets 55 and 56 of the rotor unit 3a in the axial direction. However, a rotor magnet may be disposed only on the one side in the axial direction from the coil core parts 57. In addition, the rotor unit may have a magnetic field generation unit such as a coil instead of a rotor magnet.

In the embodiment, the motor unit 3 is an axial gap-type motor. However, the motor unit may be a motor having another configuration such as a radial gap-type motor.

INDUSTRIAL APPLICABILITY

The present invention can be applied to a a power unit and a motor unit attachable to a wave gear speed reducer.

REFERENCE SIGNS LIST

2 Wave gear speed reducer
2a Recess
3 Motor unit
3a Rotor unit
3b Stator unit
11 Casing
12 Cam
12a Through hole (insertion hole)
14 External gear
15 Internal gear
31 External teeth
32 Internal teeth
51 Motor casing
52 Rotary shaft (rotary shaft unit)
54a Shaft unit (large diameter unit)
54c Projection (insertion unit)
55 Rotor magnet (magnetic field generation unit)
56 Rotor magnet (magnetic field generation unit)
61 First cover
62 Second cover (cover unit)
63 Casing unit
63a Cylindrical part
63b Flat plate unit
63c Protrusion
64 Support unit
X Axis
S Space

The invention claimed is:
1. A power unit comprising:
a wave gear speed reducer; and
a motor unit attached to the wave gear speed reducer;
the wave gear speed reducer comprising:
a casing extending in an axial direction;
a ring-shaped internal gear disposed in the casing to be rotatable with respect to the casing and including internal teeth on an inner circumference;
an external gear including a flexible cylindrical part disposed on an inner side of the internal gear in a radial direction, and including external teeth that mesh with the internal teeth on an outer circumference of the cylindrical part; and
cam disposed in the cylindrical part in the radial direction which deforms the cylindrical part in the radial direction;
wherein the external gear is fixed to the casing;
the motor unit comprising:
a rotary shaft unit extending in the axial direction;
a rotor unit provided to be rotatable with respect to the rotary shaft unit integrally with the rotary shaft unit;
a stator unit disposed to face the rotor unit; and
a motor casing covering the rotary shaft unit, the rotor unit;
wherein the stator unit is fixed to the motor casing,
wherein the motor casing includes a cover unit covering the rotor unit and the stator unit from a first side in the axial direction,
wherein the rotary shaft unit extends to the first side in the axial direction, penetrates the cover unit,
wherein the rotary shaft is connected to the cam,
wherein the cover unit includes a support unit, and
wherein the support unit extends to the axial direction, covers at least a part of the rotary shaft unit, rotatably supports the rotary shaft unit, and
wherein at least a part of the support unit is positioned inside the cylindrical part of the external gear.
2. The power unit according to claim 1, further comprising:
a bearings disposed between the rotary shaft unit and the support unit.

3. The power unit according to claim 1,
wherein the cam comprises an insertion hole,
wherein the rotary shaft unit includes
an insertion unit which is positioned at a tip part,
wherein the insertion unit is inserted into the insertion hole,
wherein the rotary shaft unit includes a large diameter unit which is positioned on a second side in the axial direction from the insertion unit, and
wherein an outer diameter of the large diameter unit is greater than a width of the insertion unit in the radial direction.

4. The power unit according to claim 1, wherein the cover unit includes a protrusion positioned in a recess provided in the wave gear speed reducer.

5. The power unit according to claim 1, wherein the rotor unit is disposed to face the stator unit in the axial direction.

6. The power unit according to claim 1, wherein the rotor unit includes two magnetic field generation parts disposed with the stator unit interposed therebetween.

7. The power unit according to claim 2,
wherein the cam comprises an insertion hole,
wherein the rotary shaft unit includes an insertion unit which is positioned at a tip part,
wherein the insertion unit is inserted into the insertion hole,
wherein the rotary shaft unit includes a large diameter unit which is positioned on a second side in the axial direction from the insertion unit, and
wherein an outer diameter of the large diameter unit is greater than a width of the insertion unit in the radial direction.

8. The power unit according to claim 2, wherein the cover unit includes a protrusion positioned in a recess provided in the wave gear speed reducer.

9. The power unit according to claim 3, wherein the cover unit includes a protrusion positioned in a recess provided in the wave gear speed reducer.

10. The power unit according to claim 2, wherein the rotor unit is disposed to face the stator unit in the axial direction.

11. The power unit according to claim 3, wherein the rotor unit is disposed to face the stator unit in the axial direction.

12. The power unit according to claim 4, wherein the rotor unit is disposed to face the stator unit in the axial direction.

13. The power unit according to claim 2,
wherein the rotor unit includes two magnetic field generation parts disposed with the stator unit interposed therebetween.

14. The power unit according to claim 3,
wherein the rotor unit includes two magnetic field generation parts disposed with the stator unit interposed therebetween.

15. The power unit according to claim 4,
wherein the rotor unit includes two magnetic field generation parts disposed with the stator unit interposed therebetween.

16. The power unit according to claim 5,
wherein the rotor unit includes two magnetic field generation parts disposed with the stator unit interposed therebetween.

17. A motor unit connectable to a wave gear speed reducer comprising:
a rotary shaft unit extending in an axial direction;
a rotor unit provided to be rotatable with respect to the rotary shaft unit integrally with the rotary shaft unit;
a stator unit disposed to face the rotor unit; and
a motor casing covering the rotary shaft unit, the rotor unit, and the stator unit;
wherein the stator unit is fixed to the motor casing,
wherein the motor casing includes a cover unit covering the rotor unit and the stator unit,
wherein the rotary shaft unit extends to the axial direction, and penetrates the cover unit,
wherein the cover unit includes a support unit,
wherein the support unit extends to the axial direction, covers at least a part of the rotary shaft unit,
wherein the support unit rotatably supports the rotary shaft unit,
wherein at least a part of the support unit is configured to be positioned inside the wave gear speed reducer, and
wherein the rotary shaft unit is connectable to the wave gear speed reducer.

18. The motor unit according to claim 17, further comprising:
a bearing disposed between the rotary shaft unit and the support unit.

19. The motor unit according to claim 17,
wherein the rotary shaft unit includes an insertion unit which is positioned at a tip part,
wherein the rotary shaft unit includes a large diameter unit which is positioned on a second side in the axial direction from the insertion unit,
wherein an outer diameter of the large diameter unit is greater than a width of the insertion unit in the radial direction, and
wherein the insertion unit is connectable to the wave gear speed reducer.

20. The motor unit according to claim 17,
wherein a thickness of an inner circumference of the motor casing is greater than a thickness of an outer circumference of the motor casing.

* * * * *